US 12,154,268 B2

(12) United States Patent
Frank

(10) Patent No.: US 12,154,268 B2
(45) Date of Patent: Nov. 26, 2024

(54) DIGITAL TISSUE SEGMENTATION

(71) Applicant: Steven Frank, Framingham, MA (US)

(72) Inventor: Steven Frank, Framingham, MA (US)

( * ) Notice: Subject to any disclaimer, the term of this patent is extended or adjusted under 35 U.S.C. 154(b) by 709 days.

(21) Appl. No.: 17/402,524

(22) Filed: Aug. 14, 2021

(65) Prior Publication Data

US 2021/0398282 A1 Dec. 23, 2021

Related U.S. Application Data

(63) Continuation-in-part of application No. 16/904,666, filed on Jun. 18, 2020.

(60) Provisional application No. 63/078,787, filed on Sep. 15, 2020.

(51) Int. Cl.
*G06T 7/00* (2017.01)
*G06T 3/40* (2024.01)
*G06T 5/70* (2024.01)
*G06T 7/11* (2017.01)

(52) U.S. Cl.
CPC .............. *G06T 7/0012* (2013.01); *G06T 3/40* (2013.01); *G06T 5/70* (2024.01); *G06T 7/11* (2017.01); *G06T 2207/20021* (2013.01); *G06T 2207/20032* (2013.01); *G06T 2207/20084* (2013.01); *G06T 2207/20192* (2013.01); *G06T 2207/30024* (2013.01)

(58) Field of Classification Search
CPC .................... G06T 7/0012; G06T 7/11; G06T 2207/20021
See application file for complete search history.

(56) References Cited

U.S. PATENT DOCUMENTS

| | | |
|---|---|---|
| 2008/0273787 A1 | 11/2008 | Ducksbury et al. |
| 2009/0080731 A1 | 3/2009 | Krishnapuram et al. |
| 2016/0140716 A1 | 5/2016 | Kadir et al. |
| 2016/0310090 A1* | 10/2016 | Klinder ................. A61B 5/055 |
| 2016/0350912 A1 | 12/2016 | Koide et al. |
| 2017/0161894 A1 | 6/2017 | Fisher et al. |
| 2017/0294017 A1* | 10/2017 | Yuan ..................... G06T 7/0012 |

(Continued)

FOREIGN PATENT DOCUMENTS

WO WO-2019183596 9/2019

OTHER PUBLICATIONS

"Deep convolutional activation features for large scale brain tumor histopathology image classification and segmentation" by Yan (Year: 2016).*

(Continued)

*Primary Examiner* — Benjamin O Dulaney

(57) ABSTRACT

Accurate tissue segmentation is performed without a priori knowledge of tissue type or other extrinsic information not found within the subject image, and may be combined with classification analysis so that diseased tissue is not only delineated within an image but also characterized in terms of disease type. In various embodiments, a source image is decomposed into smaller overlapping subimages such as square or rectangular tiles, which are sifted based on a visual criterion. The visual criterion may be one or more of image entropy, density, background percentage, or other discriminator. A convolutional neural network produces tile-level classifications that are aggregated to produce a tissue segmentation and, in some embodiments, to classify the source image or a subregion thereof.

18 Claims, 2 Drawing Sheets

(56) References Cited

U.S. PATENT DOCUMENTS

| | | | |
|---|---|---|---|
| 2018/0082153 A1 | 3/2018 | Wan et al. | |
| 2018/0129911 A1 | 5/2018 | Madabhushi et al. | |
| 2018/0232883 A1 | 8/2018 | Sethi et al. | |
| 2018/0253590 A1 | 9/2018 | Lloyd et al. | |
| 2019/0147592 A1* | 5/2019 | Yu | G06V 20/695 382/128 |
| 2019/0206056 A1* | 7/2019 | Georgescu | G06T 7/0014 |
| 2019/0213443 A1 | 7/2019 | Cunningham et al. | |
| 2019/0333222 A1* | 10/2019 | Gatti | G06T 7/143 |
| 2020/0311931 A1 | 10/2020 | Yeh et al. | |
| 2020/0410687 A1* | 12/2020 | Siemionow | G06T 7/62 |
| 2021/0050094 A1 | 2/2021 | Orringer et al. | |
| 2021/0052212 A1* | 2/2021 | Yaroslavsky | A61B 5/0066 |
| 2021/0158522 A1* | 5/2021 | Weisenfeld | G06F 18/22 |
| 2022/0076410 A1* | 3/2022 | Georgescu | G06T 7/0012 |
| 2022/0084660 A1* | 3/2022 | Georgescu | G16H 30/40 |

OTHER PUBLICATIONS

Akkus, Z., Galimzianova, A., Hoogi, A., Rubin, D.L., Erickson, B.J., 2017. Deep Learning for Brain MRI Segmentation: State of the Art and Future Directions. J. Digit. Imaging.

Garcia-Garcia, A., Orts-Escolano, S., Oprea, S.O., Villena-Martinez, V., Garcia-Rodriguez, J., 2017. A review on deep learning techniques applied to semantic segmentation. arXiv.

Havaei, M., Davy, A., Warde-Farley, D., Biard, A., Courville, A., Bengio, Y., Pal, C., Jodoin, P.M., Larochelle, H., 2017. Brain tumor segmentation with Deep Neural Networks. Med. Image Anal.

Kleczek, P., Jaworek-Korjakowska, J., Gorgon, M., 2020. A novel method for tissue segmentation in high-resolution H&E-stained histopathological whole-slide images. Comput. Med. Imaging Graph.

Xu, J., Luo, X., Wang, G., Gilmore, H., Madabhushi, A., 2016. A Deep Convolutional Neural Network for segmenting and classifying epithelial and stromal regions in histopathological images. Neurocomputing.

Vu, Q. D., Graham, S., To, M. N. N., Shaban, M., Qaiser, T., Koohbanani, N. A., . . . Saltz, J., 2018, Oct. 31. Methods for segmentation and classification of digital microscopy tissue images. ArXiv.

Office Action issued in parent application, U.S. Appl. No. 16/904,666 on Sep. 8, 2021.

Coudray et al., "Classification and mutation prediction from non-small cell lung cancer histopathology images using deep learning," Nature Medicine Sep. 17, 2018.

Office Action issued in parent application, U.S. Appl. No. 16/904,666 on Oct. 6, 2021.

Michalak et al., Improvement of Image Binarization Methods Using Image Preprocessing with Local Entropy Filtering for Alphanumerical Character Recognition Purposes, Entropy 21(6):562 (2019).

Oliveira et al., Road surface crack detection: Improved segmentation with pixel-based refinement, European Signal Processing Conference, 2009.

\* cited by examiner

DIGITAL TISSUE SEGMENTATION

CROSS-REFERENCE TO RELATED APPLICATION

This is a continuation-in-part of U.S. Ser. No. 16/904,666, filed on Jun. 18, 2020, and also claims priority to, and the benefits of, U.S. Ser. No. 63/078,787, filed on Sep. 15, 2020. The entire disclosures of the foregoing priority documents are hereby incorporated by reference.

FIELD OF THE INVENTION

The present invention relates, generally, to processing and automated classification of large, high-resolution digital images, and in particular to visually representing classification results corresponding to different tissue types at a subimage level.

BACKGROUND

"Deep learning" approaches have been applied to a wide range of medical images with the objective of improving diagnostic accuracy and clinical practice. Many efforts have focused on images that are inherently small enough to be processed by convolutional neural networks (CNNs), or which can be downsampled to a suitable size without loss of fine features necessary to the classification task. In general, commonly used CNNs on standard hardware can comfortably handle image sizes of 600×600 pixels or less; larger images entail complex architectures that are difficult to train, perform slowly, and require significant memory resources. Among the most challenging medical images to analyze computationally are digital whole-slide histopathology images, which are often quite large 10,000 to more than 100,000 pixels in each dimension. Their large size means that even traditional visual inspection by trained pathologists is difficult. To make such images amenable to CNN analysis, researchers have decomposed them into much smaller tiles that are processed individually. A probability framework is applied to the tile-level classifications to classify the slide. The most successful recent studies have achieved performance comparable to that of experienced pathologists.

A longstanding impediment to clinical adoption of machine-learning techniques is the inability of many such techniques to convey the rationale behind a classification, diagnosis or other output. Black-box models whose reasoning is opaque or impervious to retrospective analysis may pose clinical dangers that outweigh the benefits of a computational approach. Until recently, CNNs have fallen squarely within the black-box category, but techniques such as gradient-weighted class activation maps ("Grad-CAM") have pried the box open, highlighting the image regions important to a CNN classification.

While the ability to visualize regions of an image important to classification is useful, it does not necessarily address clinical acceptance. Grad-CAM images, for example, each represent a minuscule portion of the total slide area. Painstaking analysis of many such images could help validate the proposition that the CNN is "looking" where it should. But for any given slide classification, Grad-CAM cannot realistically illuminate its underlying basis; the Grad-CAM images are too small and a readable map of them superimposed on the slide would be impossibly large. Moreover, identifying which image regions attract the attention of a CNN does not reveal the underlying rationale for a classification only the pixels on which the classification, whatever its basis, depended most strongly. But the CNN does process every pixel in the image. Attaching the highest classification importance to image regions of lower diagnostic significance does not necessarily undermine the validity of the classification.

More generally, the ability to visualize distinct tissue regions in a medical image can be important diagnostically whether or not an explicit classification is involved. Computational techniques for automatic "tissue segmentation" partition an image into segments corresponding to different tissue classes, e.g., whole organs or sub-regions of organs (such as liver or lung segments, or muscle groups). Areas with pathologies such as tumors or inflammation can also be isolated using segmentation. Traditionally, diagnoses have been based on manual measurement of lesion dimensions and their number in a medical image. More recently, the role of imaging has grown beyond diagnosis to include quantitative characterization of tissue volume or shape, chemical composition, and functional activity, and automated tissue segmentation has played an important part in this evolution. But segmentation techniques tend to be complex and computationally demanding, and may require knowledge of the imaged anatomical structure or other a priori information.

SUMMARY

Embodiments of the present invention provide approaches to accurate tissue segmentation that do not require a priori knowledge of tissue type or other extrinsic information not found within the subject image. Moreover, the approaches discussed herein may be combined with classification analysis so that diseased tissue is not only delineated within an image but also characterized in terms of disease type. The techniques may be applied even to very large medical images such as digital pathology slides. In various embodiments, a source image is decomposed into smaller overlapping subimages such as square or rectangular tiles, which are sifted based on a visual criterion. The visual criterion may be one or more of image entropy, density, background percentage, or other discriminator. A classifier, such as a CNN or based on an autoencoder, produces tile-level classifications that are aggregated to produce a tissue segmentation and, in some embodiments, to classify the source image or a subregion thereof.

Overlapping subimages represents a useful data-augmentation expedient for training purposes, but also is found to enhance classification of test images and mapping accuracy, with the enhancement depending directly on the degree of overlap. In particular, the greater the degree of overlap, the greater will be the number of images that may contribute to the classification of any particular pixel, thereby potentially increasing the accuracy of the tissue segmentation.

Accordingly, in a first aspect, the invention pertains to a method of computationally generating a tissue segmentation from a source digital image of a tissue sample. In various embodiments, the method comprises the steps of computationally generating a plurality of overlapping subimage regions (e.g., tiles) of the source image; computationally sifting the subimage regions in accordance with a visual criterion; computationally generating classification probabilities for the sifted subimage regions, where the classification probabilities correspond to at least two tissue types; and computationally designating, as the tissue segmentation, a region of the source image corresponding to the union of overlapping subimage regions whose classification probabilities specify one of the at least two tissue types. For example, the tissue types may be normal and abnormal tissue, or normal and a plurality of abnormal tissue types.

The union of overlapping subimage regions may include subimage regions corresponding to all of the abnormal tissue types. The union of overlapping subimage regions may include subimage regions corresponding to a selected one of the abnormal tissue types; for example, the selected abnormal tissue type may have, among the abnormal tissue types, the largest number of correspondingly classified subimage regions.

The step of computationally designating may comprise visually distinguishing, in the source image, the region from a remainder of the source image. In some embodiments, the method further comprises the step of computationally smoothing a contour of the region (using, for example, a median filter). The method may further comprise the step of computationally resizing the region to compensate for the size of the subimage regions. In some embodiments, the tissue segmentation is a binary mask that is opaque outside the region and transparent within the region. If desired, the classification probabilities for overlapping subimage regions may be combined at a pixel level. The overlapping subimage regions may be obtained by selecting, from a candidate set of subimage regions, the subimage regions having image entropies between a pair of boundary entropy values.

In another aspect, the invention relates to a method of computationally generating a tissue segmentation from a digital whole-slide image of a tissue sample. In various embodiments, the method comprises the steps of (a) computationally downscaling the whole-slide image into a working image having a resolution smaller than a resolution of the whole-slide image; (b) generating a plurality of overlapping subimage regions of the working image; (c) computationally sifting the subimage regions in accordance with a visual criterion; (d) computationally generating classification probabilities for the sifted subimage regions, the classification probabilities corresponding to at least two tissue types; and (e) computationally generating the tissue segmentation from subimage regions whose classification probabilities specify a first of the at least two tissue types. At least step (e) is performed on a mobile device. In some embodiments, two or more of steps (b), (c), (d) and (e) are performed on a mobile device. For example, steps (a), (b), and (c) may be performed on one or more cloud servers while steps (d) and (e) are performed on the mobile device.

In still another aspect, the invention pertains to an image-processing system for computationally generating a tissue segmentation from a source digital image of a tissue sample. In various embodiments, the system comprises a processor; a computer memory; a first image buffer for storing a source image; a tiling module for generating overlapping subimages of the source image; a subimage analyzer for computationally sifting the subimage regions in accordance with a visual criterion; a classifier, executed by the processor, for computationally generating classification probabilities for the sifted subimages, where the classification probabilities correspond to at least two tissue types; a mapping module, executed by the processor, for computationally designating, as the tissue segmentation, a region of the source image corresponding to a union of overlapping subimage regions whose classification probabilities specify a first of the at least two tissue types. For example, the classifier may be a convolutional neural network trained to distinguish normal from abnormal tissue, or among normal and a plurality of abnormal tissue types. The selected abnormal tissue type may have, among the abnormal tissue types, the largest number of correspondingly classified subimage regions. Alternatively, the classifier may be an autoencoder paired with a hyperplane classifier, such as a multilayer perceptron classifier.

In some embodiments, the mapping module is configured to generate a digital image, based on the source image, visually distinguishing the region from the remainder of the source image. The mapping module may be further configured to computationally smooth a contour of the region and/or to computationally resize the region to compensate for a size of the subimage regions. The mapping module may be configured to generate the tissue segmentation is a binary mask opaque outside the region and transparent within the region. The mapping module may combine the classification probabilities for overlapping subimage regions at a pixel level. In some embodiments, the tiling module is configured to generate the overlapping subimage regions by selecting, from a candidate set of subimage regions, the subimage regions having image entropies between a pair of boundary entropy values.

Yet another aspect of the invention relates to a method of computationally generating a tissue segmentation from a source digital image of a tissue sample comprising, in various embodiments, the steps of computationally generating a plurality of overlapping subimage regions of the source image; computationally sifting the subimage regions in accordance with a visual criterion; computationally generating first classification probabilities for the sifted subimage regions, the classification probabilities corresponding to at least three tissue types; computationally generating second classification probabilities for subimage regions corresponding to fewer than the at least three tissue types; and computationally designating, as the tissue segmentation, a region of the source image corresponding to a union of overlapping subimage regions whose second classification probabilities exceed a threshold.

Still a further aspect of the invention pertains to an image-processing system for computationally generating a tissue segmentation from a source digital image of a tissue sample. In various embodiments, the system comprises a processor; a computer memory; a first image buffer for storing a source image; a tiling module for generating overlapping subimages of the source image; a subimage analyzer for computationally sifting the subimage regions in accordance with a visual criterion; a first classifier, executed by the processor, for computationally generating classification probabilities for the sifted subimages, the classification probabilities corresponding to at least three tissue types; a second classifier, executed by the processor, for computationally generating classification probabilities for subimage regions corresponding to fewer than the at least three tissue types; and a mapping module, executed by the processor, for computationally designating, as the tissue segmentation, a region of the source image corresponding to a union of overlapping subimage regions whose second classification probabilities exceed a threshold. The first and second classifiers may be of the same type (e.g., CNNs or autoencoders) or of different types (e.g., the first a CNN and the second an autoencoder, or vice versa); and if of the same type, may have the same or different architectures (e.g., different numbers of convolutional layers).

In some embodiments, the mapping module is configured to generate a digital image, based on the source image, visually distinguishing the region from the remainder of the source image. The mapping module may be further configured to computationally smooth a contour of the region and/or to computationally resize the region to compensate for a size of the subimage regions. The mapping module may be configured to generate the tissue segmentation is a binary mask opaque outside the region and transparent within the region. The mapping module may combine the classification probabilities for overlapping subimage regions at a pixel level. In some embodiments, the tiling module is configured to generate the overlapping subimage regions by selecting, from a candidate set of subimage regions, the subimage regions having image entropies between a pair of boundary entropy values.

In another aspect, the invention relates to a method of preprocessing a digital source image. In various embodiments, the method comprises the steps of computationally generating a plurality of subimage regions of the source image; for each subimage region, computationally determining pixel value frequencies for populations of pixel values in the subimage region corresponding to background regions, each of the pixel value frequencies corresponding to a number of pixels having an associated value; summing the pixel value frequencies; and saving, to a computer memory, subimage regions whose summed pixel values represent a fraction of pixels in the subimage region no greater than a threshold. The threshold may be, for example, 0.5, 0.4, 0.3, 0.2, or 0.1. The method may further comprise the step of computationally identifying all pixel values corresponding to background regions in the source image.

In yet another aspect, the invention pertains to an image-processing system for preprocessing a digital source image comprising, in various embodiments, a processor; a computer memory; a first image buffer for storing the source image; a tiling module for generating overlapping subimages of the source image; and a subimage analyzer for (i) computationally determining pixel value frequencies for populations of pixel values in the subimage corresponding to background regions, each of the pixel value frequencies corresponding to a number of pixels having an associated value, (ii) summing the pixel value frequencies, and (iii) saving, to the computer memory, subimages whose summed pixel values represent a fraction of pixels in the subimage region no greater than a threshold.

DESCRIPTION OF THE DRAWINGS

The foregoing discussion will be understood more readily from the following detailed description of the disclosed technology, when taken in conjunction with the following drawings, in which.

DESCRIPTION

Figure 1:
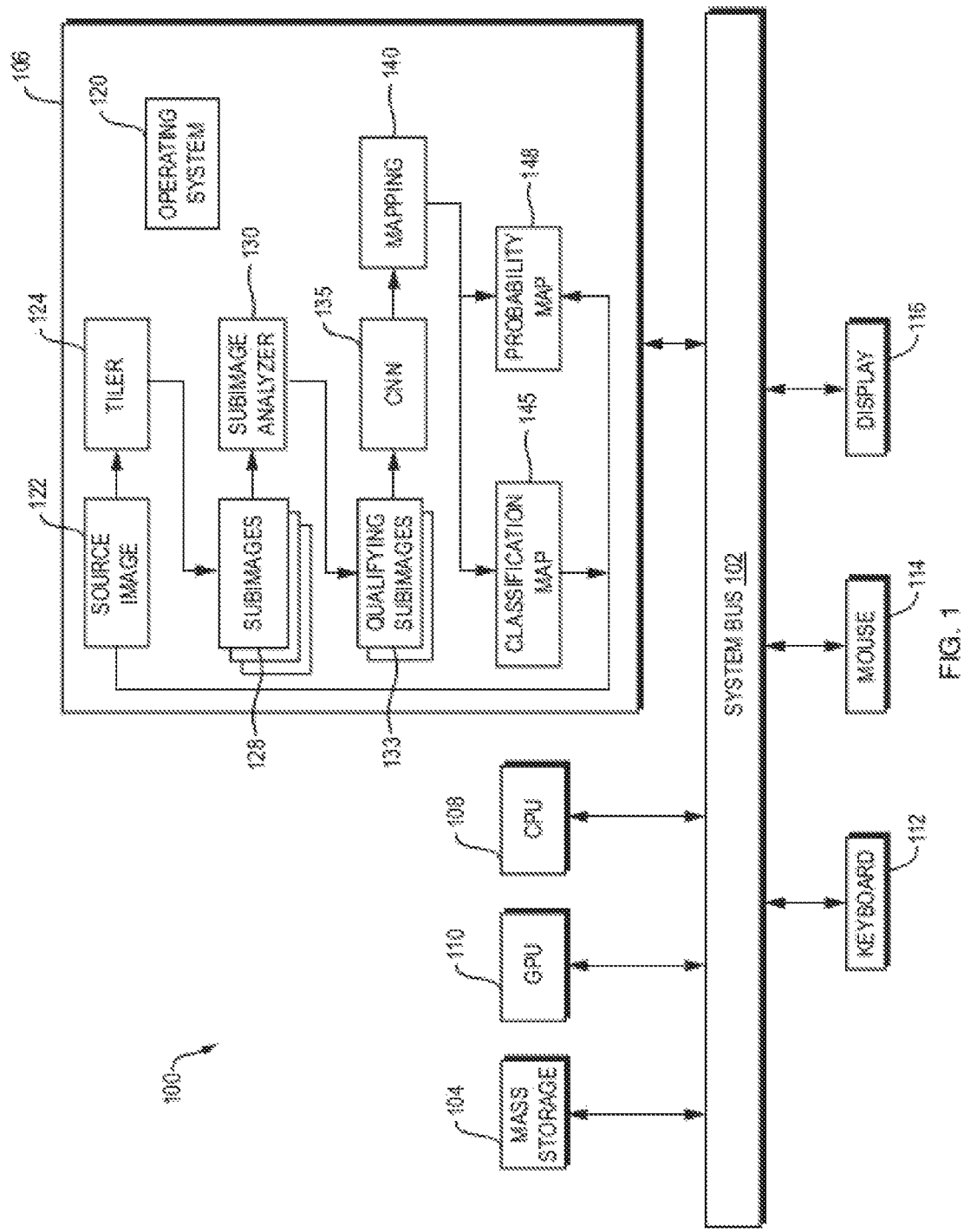
FIG. 1 schematically illustrates a representative hardware architecture according to embodiments of the invention.

Refer first to FIG. 1, which illustrates a representative system 100 implementing an embodiment of the present invention. As indicated, the system 100 includes a main bidirectional bus 102, over which all system components communicate. The main sequence of instructions effectuating the functions of the invention and facilitating interaction between the user and the system reside on a mass storage device (such as a hard disk, solid-state drive or optical storage unit) 104 as well as in a main system memory 106 during operation. Execution of these instructions and effectuation of the functions of the invention are accomplished by a central processing unit ("CPU") 108 and, optionally, a graphics processing unit ("GPU") 110. The user interacts with the system using a keyboard 112 and a position-sensing device (e.g., a mouse) 114. The output of either device can be used to designate information or select particular areas of a screen display 116 to direct functions to be performed by the system.

The main memory 106 contains instructions, conceptually illustrated as a group of modules, that control the operation of CPU 108 and its interaction with the other hardware components. An operating system 120 directs the execution of low-level, basic system functions such as memory allocation, file management and operation of mass storage devices 104. At a higher level, a source image 122, stored (e.g., as a NumPy array) in an image buffer that may be a partition of main memory 106, is processed by a tiler module 124 to produce a plurality of subimage portions (or "tiles") 128 of source image 122 based on a user-specified overlap factor. Tiles 128 may be stored in a storage device 104 along with coordinates specifying their locations in source image 122.

An analyzer 130 sifts subimages 128 according to a visual criterion, as described in greater detail below, to identify the subimages 133 that satisfy the criterion. The qualifying subimages 133 are analyzed by a classifier, e.g., a CNN 135 that has been trained for the classification task of interest. CNN 135 may be straightforwardly implemented without undue experimentation. Python/Keras code for a suitable five-layer CNN architecture may be found at https://github.com/stevenjayfrank/A-Eye, the contents of which are incorporated by reference herein. Alternatively, the classifier may be an autoencoder paired with a hyperplane classifier such as a multilayer perceptron or a support vector machine. The autoencoder learns a representation (encoding) for the sifted tiles at a dimensionality low enough for classification using a hyperplane classifier. To achieve dimensionality reduction, the autoencoder is trained to ignore insignificant data. See, e.g., Zeggada et al., "Multilabeling UAV images with Autoencoder networks," *Proc. of* 2017 *Joint Urban Remote Sensing Event*, DOI:10.1109/JURSE.2017.7924544, the entire disclosure of which is hereby incorporated by reference. For ease of presentation, the ensuing discussion presumes use of a CNN classifier, it being understood that alternatives known to those of skill in the art are within the scope of the invention.

CNN 135 computes a classification probability for each qualifying subimage 133. A mapping module 140 builds a classification map 145 by computing the average probability associated with each classified pixel across all subimages that include that pixel, or otherwise combining pixel-level probabilities as described below. So long as CNN 135 is calibrated—i.e., the predicted probabilities correspond reasonably well with true likelihoods—the pixel-level probabilities will be accurate (and contributions from multiple tiles will reduce error). From classification map 145, mapping module 140 generates the probability map 148 based on the final probability value of each classified pixel and the color associated with that value. Because only part of the original source image may have associated probability levels (since, usually, not all subimages satisfy the visual criterion), it may be useful for probability map 148 to represent source image 122 as a grayscale (or line or other monochromatic) image with colors overlaid translucently where probabilities were obtained. This is straightforwardly implemented in accordance with well-known techniques.

Classification map 145 and probability map 148 may be stored in memory 106 as data arrays, image files, or other data structure, but need not be distinct. Instead, probability map 148 may be generated directly from the source image (e.g., in grayscale format) and average (or otherwise combined) pixel-level classification probabilities as these are computed —i.e., the probability and classification maps may be the same map.

In one embodiment, tiler 124 generates subimage tiles 128 of specified dimensions from a source image 122 by successive identification of vertically and horizontally overlapping tile-size image regions. The Python Imaging Library, for example, uses a Cartesian pixel coordinate system, with (0,0) in the upper left corner. Rectangles are represented as 4-tuples, with the upper left corner given first; for example, a rectangle covering all of an 800×600 pixel image is written as (0, 0, 800, 600). The boundaries of a subimage of width=w and height=h are represented by the tuple (x, y, x+w, y+h), so that x+w and y+h designate the bottom right coordinate of the subimage.

Figure 2:
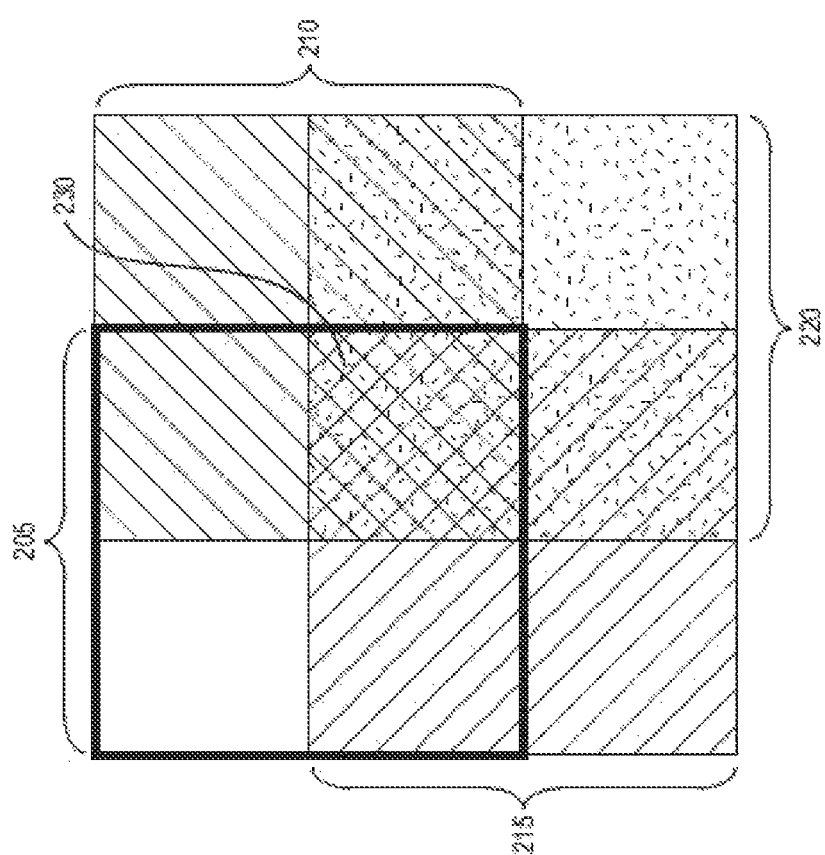
FIG. 2 illustrates two-dimensional overlap among subimages.

The tile overlap factor may be defined in terms of the amount of allowed overlap between vertically or horizontally successive subimages; hence, an overlap factor of ½ results in 50% vertical or horizontal overlap between consecutive subimages. This is illustrated in FIG. 2. Tile pairs 205, 210 and 215, 220 have 50% horizontal overlap (with the border of tile 205 being emphasized for clarity). In addition, tile pair 215, 220 has 50% vertical overlap with tile pair 205, 210. This two-dimensional overlap results in a central region 230 where all four tiles 205, 210, 215, 220 overlap and may contribute, by averaging or other combination, to a classification probability. The greatest number of overlapping images occupy the central region 230, which, as overlap increases, diminishes in size but increases in terms of the number of contributing subimages. More importantly, increasing overlap means that more of the area of any single tile will overlap with one or more other tiles, so that more pixels of any tile will receive probability contributions from other tiles with consequent reduction in classification error; consequently, if only a minority of tiles are misclassified, the effect of overlap by properly classified tiles will overwhelm the misclassification error and the resulting probability map will have high accuracy. Typical overlap factors exceed 50%, e.g., 60%, 70%, 80%, or even 90% or more along both dimensions.

The optimal tile size may be determined for a particular application by testing various tile sizes to find the best-performing size. In the case of analysis of artwork, the optimal tile size may be specific to an artist or even to a particular period or genre of that artist as described in Frank et al. For example, the tile size may range from 100×100 to 600×600 pixels. Medical images, particularly very large histology or pathology) images, may be preliminarily resealed to a smaller size. This permits tiles within the previously noted working range to cover an adequately large portion of the depicted anatomy to provide accurate classifications. At the same time, the resealed image must preserve sufficient anatomic detail. These steps—initial image resealing followed by trials at multiple tile sizes —provide two "knobs" for overall optimization, which may be achieved for a given application without undue experimentation. See, e.g., Frank, "Resource-frugal classification and analysis of pathology slides using image entropy," *Biomedical Signal Processing and Control,* 66, 102388 (April 2021), which is incorporated by reference herein.

In some cases, the resolution needed for a useful segmentation map is smaller than the optimal tile size obtained for the largest usable source image—i.e., it is not possible to increase the mapping resolution by using a larger source image. In such cases, the source image may be decomposed into tiles corresponding to the necessary mapping resolution, and instead of analyzing these small tiles directly, upscaling them to a size at which CNN 135 performs efficiently. As long as the critical spatial relationships among visual features and their constituents are preserved, the coarser image resolution at the upscaled tile size will not impede accurate classification. Once the upscaled tiles are analyzed and mapping tiles identified, the map may be assembled using the corresponding original (smaller) tiles to achieve the desired resolution. Upscaling may be performed using any of a variety of conventional techniques including nearest-neighbor interpolation, bilinear and bicubic algorithms, edge-directed interpolation, Fourier-transform methods, vectorization, or using a CNN that has been trained for upscaling on the subject matter of the image.

Once the tiles are generated, they are sifted in accordance with a visual criterion with the objective of eliminating tiles that are not meaningful for classification. In one embodiment, the visual criterion is image entropy. From the purview of information theory, image entropy represents the degree of randomness (and therefore information content) of the image pixel values, just as the entropy of a message denotes (as a base-2 log) the amount of useful, nonredundant information that the message encodes:

$$H = -\sum_{k} p_k \log_2(p_k)$$

In a message, $p_k$ is the probability associated with each possible data value k. For an image, local entropy is related to the complexity within a given neighborhood, sometimes defined by a structuring element such as a circular or square region, or the entire image. Thus, the entropy of a grayscale image (or one channel of a color (e.g., RGB) image) can be calculated at each pixel position (i,j) across the image. To the extent that increasing image entropy correlates with increasingly rich feature content captured in the convolutional layers of a CNN, it provides a useful basis for selecting tiles. In one implementation, only those tiles whose entropies equal or exceed the entropy of the whole image are retained. Although no subimage will contain as much information content as the original, a subimage with comparable information diversity may pack a similar convolutional punch, so to speak, when processed by a CNN. In some embodiments, depending on the distribution of tile entropies, the discrimination criterion may be relaxed in order to increase the number of qualifying tiles. Because of the logarithmic character of the entropy function, even a slight relaxation of the criterion can result in many more qualifying tiles. For example, the criterion may be relaxed by 1% (to retain tiles with image entropies equal to or exceeding 99% of the source image entropy), or 2%, or 3%, or 4%, or 5%, or up to 10%. Tile sifting using image entropy is further described in Frank et al., "Salient Slices: Improved Neural Network Training and Performance with Image Entropy," *Neural Computation,* 32(6), 1222-1237 (2020) (hereafter "Frank et al."), which is incorporated by reference herein.

Another suitable approach to tile sifting uses a background threshold criterion, retaining only tiles with a proportion of background below a predetermined limit. Images of pathology slides, for example, typically have white or near-white backgrounds. But the tissue of interest may also have white features, gaps or inclusions. Hence, while the presence of any background can adversely affect training and classification accuracy, eliminating all tiles containing regions that might potentially be background risks discarding anatomy critical to classification. Hence, the minimum background threshold is generally set at 50% or higher, e.g., 60%, 70%, 80%, or even 90%; the optimal threshold depends on the amount of background-shaded area that may appear in non-background regions.

One approach to background identification and thresholding is to convert a colored tile to grayscale and count pixels with color values corresponding to background, e.g., white or near-white pixels. For example, an RGB image has three color channels and, hence, three two-dimensional pixel layers corresponding to red, blue, and green image components. In an eight-bit grayscale image, a pixel value of 255 represents white. To allow for some tonal variation from pure white arising from, for example, the source imaging modality, any pixel in any layer with a value above, e.g., 240 may be considered background. Summing the number of such pixels and dividing by the total number of pixels yields the background fraction. Only tiles with background fractions below the predetermined threshold (typically from 0.1 to 0.5, depending on the image characteristics) are retained.

This approach may not be suitable for tiles based on images that have been subjected to stain normalization, which reduces the color and intensity variations present in stained images from different laboratories, since the background may be shifted too far away from white. In such cases, it may be preferable to threshold tiles based on the number of identically valued pixels rather than their proximity to white or black extremes. Pixel value frequency may be obtained, for example, as an occurrence list (using, e.g., the NumPy "unique" function) specifying pixel values and their populations within the tile, and if the maximum occurrence level exceeds the threshold fraction, the tile is rejected. In some embodiments, the first n occurrence levels are summed and compared to the threshold, where n is desirably large enough to ensure that all pixels corresponding background regions are included in the count. The value of n may be straightforwardly determined by, for example, examining background regions of representative source images or tiles determine the number of associated pixel values (e.g., once again using the NumPy "unique" function), or alternatively, by simply experimenting with candidate values and examining the tiles characterized as background and non-background, selecting the value that excludes all background tiles and a minimum number of non-background tiles. In practice, n typically ranges from 2 to 5.

Still another suitable visual criterion is image density. If regions of interest for classification purposes are known to have image densities above a minimum, that minimum may be used as a discrimination threshold to sift tiles.

With renewed reference to FIG. 1, once tiles have been sifted and qualifying tiles 133 identified and stored in volatile and/or nonvolatile storage, they are used either to train CNN 135 or are presented to a trained CNN as candidate images for classification. The output of CNN 135 is generally a classification probability. In some instances, the classification is binary (e.g., Rembrandt or not Rembrandt, cancerous or benign, adenocarcinoma or squamous cell carcinoma, etc.) and the decision boundary lies at 0.5, so that output probabilities at or above 0.5 correspond to one classification and output probabilities below 0.5 reflect the other classification. In other instances, there are multiple output classifications and a "softmax" activation function maps CNN output probabilities to one of the classes.

For ease of illustration, consider binary classification of a histology slide that may contain either or both of two types—"type 1" and "type 2"—of cancerous tissue. The slide, possibly after initial resizing (e.g., downsampling to a lower resolution), is decomposed into overlapping subimages 133, which are sifted as described above. The sifted subimages are processed by CNN 135, which has been trained to distinguish between type 1 and type 2 cancers. CNN 135 assigns a classification probability p to each subimage, with probabilities in the range $0.5 \leq p < 1.0$ corresponding to type 1 and probabilities in the range $0 < p < 0.5$ corresponding to type 2. Each individual subimage may contain only a small amount of type 1 or type 2 tissue, yet the entire subimage receives a unitary probability score. As a result, the score assigned to an individual subimage may be skewed so as, for example, to ignore type 1 and/or type 2 tissue that is present but in too small a proportion to trigger the proper classification. With sufficient overlap and pixel-level averaging, this classification error will be mitigated as overlapping subimages containing progressively greater proportions of the type 1 and/or type 2 tissue contribute to the average pixel-level probabilities.

In various embodiments, a pixel-level probability map is defined to reflect average probabilities across all classified subimages. For example, in Python, a 3D m×n×d NumPy array of floats may be defined for an m×n source image, with the parameter d corresponding to the number of classified subimages (which were identified as satisfying a visual criterion). At each level d, the array is undefined or zero except for the region corresponding to one of the classified subimages, and all array values in that 2D region are set to the classification probability computed for the subimage. The probability map is an m×n array, each value [i,j] of which is equal to some combination of all nonzero values [i,j,d:] of the 3D array, e.g., the average of all nonzero values [i,j] over the d-indexed axis. The greater the degree of subimage overlap, the deeper the number of nonzero values will extend through the d-indexed axis and, therefore, the more probability values (from overlapping subimages) that will contribute to the combined value at any point of the probability map, enhancing classification accuracy for that point. Points in the probability map corresponding to points in the 3D array with no nonzero values over the d-indexed axis—i.e., where the source image lacked sufficient image entropy to generate a subimage satisfying the criterion—may be left undefined.

The probability map, therefore, is a map of pixelwise classification probabilities. The probability map may be dense (i.e., have values over most of the source image) or sparse (with relatively few defined values) depending on the amount of visual diversity in the source image and the number of qualifying tiles left after sifting. A painted portrait, for example, may have a probability map with defined values in regions corresponding to the subject's face and elaborate articles of clothing, while pathology images vary markedly in visual density and may be dense or sparse.

The probability map may be color-coded, with different colors assigned to discrete probability ranges. For example, the color coding may follow the visible spectrum, with low probabilities corresponding to blue and high probabilities represented by red, and intermediate probability ranges assigned to intermediate spectral colors. The number of colors used (i.e., how finely the probability range of 0 to 1 is partitioned) depends on the classification task and how meaningful small probability gradations are for the viewer. A relatively small number (e.g., four) may suffice for artwork authentication, since the degree of certainty associated with the probability level assigned to any particular subimage may be lower than the certainty associated with the overall classification; but a larger number (e.g., 10-20) may be used for analysis of medical images, where fine distinctions and explicit confidence levels may be essential for clinical acceptance. Examples of the former are found in Frank et al., "A Neural Network Looks at Leonardo's(?) Salvator Mundi," *Leonardo*, 2020, doi: https://doi.org/10.1162/leon_a_02004,which is incorporated herein by reference. Undefined points (i.e., points with no assigned probabilities) may be uncolored.

The classification need not be binary. For example, CNN 135 may be trained with subimages 128 corresponding to three types of tissue, e.g., normal tissue and two distinct types of malignant tumor. Probabilities may be computed according to, for example, a softmax activation function. Pixel-level probabilities from overlapping tiles can be averaged as described above or, because the softmax function is a ratio of exponentials, the mean may be weighted or otherwise adjusted accordingly. More simply, the softmax probabilities associated with each pixel may be summed and the class label corresponding to the largest sum (identified, for example, using the argmax( ) function to select a label index) assigned to the pixel with, for example, a probability of 1. Following these assignments, classification map 145 will have pixels with class labels and associated probability values of 1, and the remaining pixels will have probability values of 0.

If the image to be analyzed is known to contain only one of multiple classifications, the dominant label among labeled pixels—that is, the label with the most pixel assignments—may be identified, and in some implementations, only pixels having that label are mapped in probability map 148. If the subimage size is small enough, the dominant label can be assessed at a subimage level, and the pixels of classification map 145 corresponding to those of each subimage classified with the dominant label are assigned a probability of 1. These pixels may be assigned a monochromatic color and translucently superimposed over the grayscale version of source image 122 to generate the final probability map 148. Thus, in this case, combining class probabilities means assigning a value of 1 to any pixel intercepted by any number of tiles having the dominant label (and assigning a value of 0 otherwise). Examples of tissue segmentations generated in this fashion are illustrated in Frank, "Tissue Segmentation from Whole-Slide Images Using Lightweight Neural Networks," *Research Square*, DOI: 10.21203/rs.3.rs-122564/v1 (Dec. 15, 2020), the entire disclosure of which is hereby incorporated by reference.

If the image might validly have multiple classifications, on the other hand, these classifications may be mapped in different colors on a single probability. Alternatively, multiple probability maps each colored to show one of the classifications may be generated.

For example, CNN 135 may be trained to discriminate among multiple tumor types, but suppose it is known that any malignant histology sample can contain only one type of tumor. In that case, the image of a new sample may be tiled and sifted in accordance with a visual criterion, and the sifted tiles presented to CNN 135 for classification. Due to error, the resulting classifications may incorrectly include more than one tumor type. If CNN 135 has been properly trained, the correct classification type will predominate among tiles classified in one of the malignant categories (as opposed to classification as normal tissue). The minority tiles may therefore be ignored and only the dominant tumor tiles mapped. Since the minority tiles are excluded altogether rather than being averaged with the dominant tiles, there is no need for probability-based color coding; the dominant tiles may be overlaid in a single color on a grayscale version of the sample image, producing a tissue segmentation indicating the location and type of tumor in the sample that is, the union of all dominant tiles will be colored monochromatically in probability map 148.

Alternatively or in addition, image entropy may be used to produce boundary constraints rather than a unitary criterion that either is or is not satisfied. This is particularly useful in creating tissue segmentations, which in this context refers to probability maps distinguishing between two or more different tissue types. Frequently, the distinction is between normal and abnormal (e.g., malignant) tissue. The tissue segmentation may take the form of a colored probability map or a binary mask that, e.g., is black for all normal tissue areas and white or transparent for all abnormal tissue regions. Such a mask is considered a probability map as the latter term is used herein.

In one implementation, training images are prepared using segmentation masks that occlude non-tumor portions of an image. These masks may be generated manually, by trained pathologists, or in an automated fashion. The masks allow the tumor portions of a slide image to be extracted, and the resulting tumor-only images may be downsampled as described above and their image entropies computed. The maximum and minimum entropies of the images (or, if desired, of tiles created from the images) may be treated as boundaries or "rails" within which a candidate tile must fall in order to qualify as usable. Sifting in accordance with this criterion preliminarily eliminates tiles unlikely to correspond to tumor tissue. Thus, an image of a histology slide to be classified and/or mapped may be downsampled, tiled, and the tiles sifted using the previously established entropy boundaries. The remaining tiles may then be analyzed by CNN 135. If the CNN has been trained to distinguish between normal and abnormal tissue as a binary classification, the entropy rails serve as a preprocessing check to exclude normal tissue tiles that might have been misclassified as tumor tiles. The tiles having the classification of interest (e.g., abnormal) may be mapped as discussed above; the union of all such tiles, as mapped, constitutes the tissue segmentation, which may be overlaid onto the original image or may instead be output as a binary mask. For example, in a binary classification, the union of all abnormal tissue tiles may overlaid onto the original image as white or transparent, with the remainder of the image rendered as black. Whether white/transparent or colored, the union of overlapping tiles represents an approximation of the abnormal tissue region—i.e., a tissue segmentation. The classification probabilities for overlapping tiles may, in some embodiments, be combined at a pixel level as described above. But in other embodiments, a simple union operation over all appropriately classified tiles is employed.

Due to the tile geometry, the segmentation region will have stepped edges that appear jagged. The edges may be smoothed with a median or other smoothing filter. (It should be noted that smoothing may be beneficially applied to any type of probability map described herein.) Furthermore, tile size limits the contour accuracy of the probability map; the larger the tile size, the more the edges of the map will spill over into the oppositely classified tissue region (e.g., into normal tissue). From a clinical perspective such overinclusiveness is perhaps to be preferred to the alternative, but in any case, the tile size is generally dictated by what works best for the overall task of classifying tissue. To compensate for this spillover effect, it is possible to apply isomorphic shrinkage to the mapped regions; the larger the tile size, the greater the degree of shrinkage that may be applied before or after smoothing. The optimal amount of image resizing for a given tile size is straightforwardly obtained without undue experimentation.

If CNN 135 has been trained to distinguish between normal and multiple types of abnormal tissue, the probability map may be based on the dominant abnormal tissue type as described above, i.e., the minority tiles may be ignored and only the dominant tiles mapped. Alternatively, all tiles classified as either type of abnormal tissue may be mapped (e.g., tiles corresponding to both the dominant and minority abnormal tissue types). The latter approach may be preferred if abnormal tissue tiles are more likely to be misclassified as the wrong type of abnormal tissue than as normal tissue.

In some circumstances, it may be preferred to utilize a plurality of CNNs in sequence, e.g., to detect two different types of tissue. For example, perineural invasion by malignant tumor cells has been reported as an independent indicator of poor prognosis in cancers. Visually, it may be desirable to detect regions composed of nerve and tumor cells, e.g., where the tumor has infiltrated a nerve. Most straightforwardly, CNN 135 is trained to distinguish among nerve tissue, tumor tissue, and tissue that is neither nerve nor tumor; this may be accomplished using a categorical cross-entropy loss function and softmax activation. Inferior performance may be obtained, however, if the background tissue is heterogeneous and contains regions that are too visually similar to one of the target tissues. In this case, it may be beneficial to train a first CNN 135 to distinguish between one of the target tissues and background tissue, and a second CNN 135 to distinguish between the two target tissues. Applying the first CNN 135 to tiles derived from the original image will eliminate most of the background tissue, and subsequently applying the second CNN 135 to the surviving tiles will identify, inter alia, regions where the two target tissues are adjacent. Similarly, a CNN trained for three-way classification among two tumor types and background tissue may not adequately discriminate between the tumor types, particularly if the visual differences therebetween are subtle. Thus, a first CNN may be used to segregate tiles containing either tumor type from tiles containing background tissue, and the second CNN may analyze the tumor tiles to distinguish between the two tumor types. The two CNNs may have different architectures, e.g., the first CNN may have only a few (e.g., five) convolutional layers while the second CNN may have a more complex design (e.g., a residual network such as ResNet50, VGG16, Inception, etc.). Any number of identical or heterogeneous CNNs may be staged in this pipeline fashion to reduce a difficult multi-class classification problem to a sequence of more tractable binary classifications. Once again, either or both CNNs may be replaced with a different classifier, such as an autoencoder paired with a hyperplane classifier.

In general, it is noted that computers typically include a variety of computer-readable media that can form part of system memory and be read by the processing unit. By way of example, and not limitation, computer-readable media may take the form of volatile and/or nonvolatile memory such as read-only memory (ROM) and random access memory (RAM). A basic input/output system (BIOS), containing the basic routines that help to transfer information between elements, such as during start-up, is part of operating system 120 and is typically stored in ROM. RAM typically contains data and/or program modules that are immediately accessible to and/or presently being operated on by CPU 110. Operating system 110 may be or include a variety of operating systems such as Microsoft WINDOWS operating system, the Unix operating system, the Linux operating system, the MACINTOSH operating system, the APACHE operating system, or another operating system platform.

Any suitable programming language may be used to implement without undue experimentation the analytical functions described above and in the attached paper. Illustratively, the programming language used may include without limitation, high-level languages such as C, C++, C#, Java, Python, Ruby, Scala, and Lua, utilizing, without limitation, any suitable frameworks and libraries such as TensorFlow, Keras, PyTorch, or Theano. Further, it is not necessary that a single type of instruction or programming language be utilized in conjunction with the operation of the system and method of the invention. Rather, any number of different programming languages may be utilized as is necessary or desirable. Additionally, the software can be implemented in an assembly language and/or machine language.

CPU 108 may be a general-purpose processor, e.g., an INTEL CORE i9 processor, but may include or utilize any of a wide variety of other technologies including special-purpose hardware, such as GPU 110 (e.g., an NVIDIA 2070), a microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention. In some embodiments, all of the operations—decomposing a source image (typically downscaled if the original is very large, e.g., a "whole slide" pathology image) into tiles, sifting the tiles in accordance with a visual criterion, generating classification probabilities for the sifted tiles, and creating a segmentation map) are performed on a single device, e.g., a mobile device such as a tablet or "smart phone" implementing, for example, the iOS operating system supplied by APPLE Inc. or the ANDROID operating system supplied by GOOGLE Inc. In other embodiments, some operations (such as CNN analysis of tiles) may be performed by an external device, such as a "cloud" server in communication, via the internet, with a local device. For example, a source image may be rescaled by one cloud server, the rescaled (smaller) image inspected on a local device, and the analysis and map generation performed on a different cloud server. The distribution of functionality among devices is arbitrary and may depend on design preference and constraints.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

The invention claimed is:

1. A method of computationally generating a tissue segmentation from a source digital image of a tissue sample, the method comprising the steps of:
   computationally generating a plurality of overlapping subimage regions of the source image;
   computationally sifting the subimage regions in accordance with a visual criterion;
   computationally generating, with a convolutional neural network, a unitary classification probability applying to all pixels of each of the sifted subimage regions, each of the classification probabilities corresponding to at least two tissue types; and
   computationally designating, as the tissue segmentation, at least one region of the source image corresponding to a union of overlapping subimage regions or portions thereof whose pixel-level combined classification probabilities specify a first of the at least two tissue types.

2. The method of claim 1, wherein the tissue types are normal and abnormal tissue.

3. The method of claim 1, wherein the tissue types are normal and a plurality of abnormal tissue types.

4. The method of claim 3, wherein the union of overlapping subimage regions includes subimage regions corresponding to all of the abnormal tissue types.

5. The method of claim 3, wherein the union of overlapping subimage regions includes subimage regions corresponding to a selected one of the abnormal tissue types.

6. The method of claim 5, wherein the selected abnormal tissue type has, among the abnormal tissue types, a largest number of correspondingly classified subimage regions.

7. The method of claim 1, wherein the step of computationally designating comprises visually distinguishing, in the source image, the region from a remainder of the source image.

8. The method of claim 1, further comprising the step of computationally smoothing a contour of the region.

9. The method of claim 1, further comprising the step of computationally resizing the region to compensate for a size of the subimage regions.

10. The method of claim 1, wherein the tissue segmentation is a binary mask, the mask being opaque outside the region and transparent within the region.

11. The method of claim 1, wherein the overlapping subimage regions are obtained by selecting, from a candidate set of subimage regions, the subimage regions having image entropies between a pair of boundary entropy values.

12. An image-processing system for computationally generating a tissue segmentation from a source digital image of a tissue sample, the system comprising:
   a processor;
   a computer memory;
   a first image buffer for storing a source image;
   a tiling module for generating overlapping subimages of the source image;
   a subimage analyzer for computationally sifting the subimage regions in accordance with a visual criterion;
   a convolutional neural network, executed by the processor, a unitary classification probability applying to all pixels of each of the sifted subimages, each of the classification probabilities corresponding to at least two tissue types; and
   a mapping module, executed by the processor, for computationally designating, as the tissue segmentation, a region of the source image corresponding to a union of overlapping subimage regions or portions thereof whose pixel-level combined classification probabilities specify a first of the at least two tissue types.

13. The system of claim 12, wherein the classifier is a convolutional neural network trained to distinguish normal from abnormal tissue.

14. The system of claim 12, wherein the classifier is a convolutional neural network trained to distinguish among normal and a plurality of abnormal tissue types.

15. The system of claim 14, wherein the union of overlapping subimage regions includes subimage regions corresponding to all of the abnormal tissue types.

16. The system of claim 14, wherein the union of overlapping subimage regions includes subimage regions corresponding to a selected one of the abnormal tissue types.

17. The system of claim 16, wherein the selected abnormal tissue type has, among the abnormal tissue types, a largest number of correspondingly classified subimage regions.

18. The system of claim 12, wherein the mapping module is configured to generate a digital image, based on the source image, visually distinguishing the region from a remainder of the source image.

* * * * *